Oct. 21, 1969  J. D. FRANKLIN  3,473,227
TARGET MEASURING MEANS
Filed July 26, 1967  2 Sheets-Sheet 1
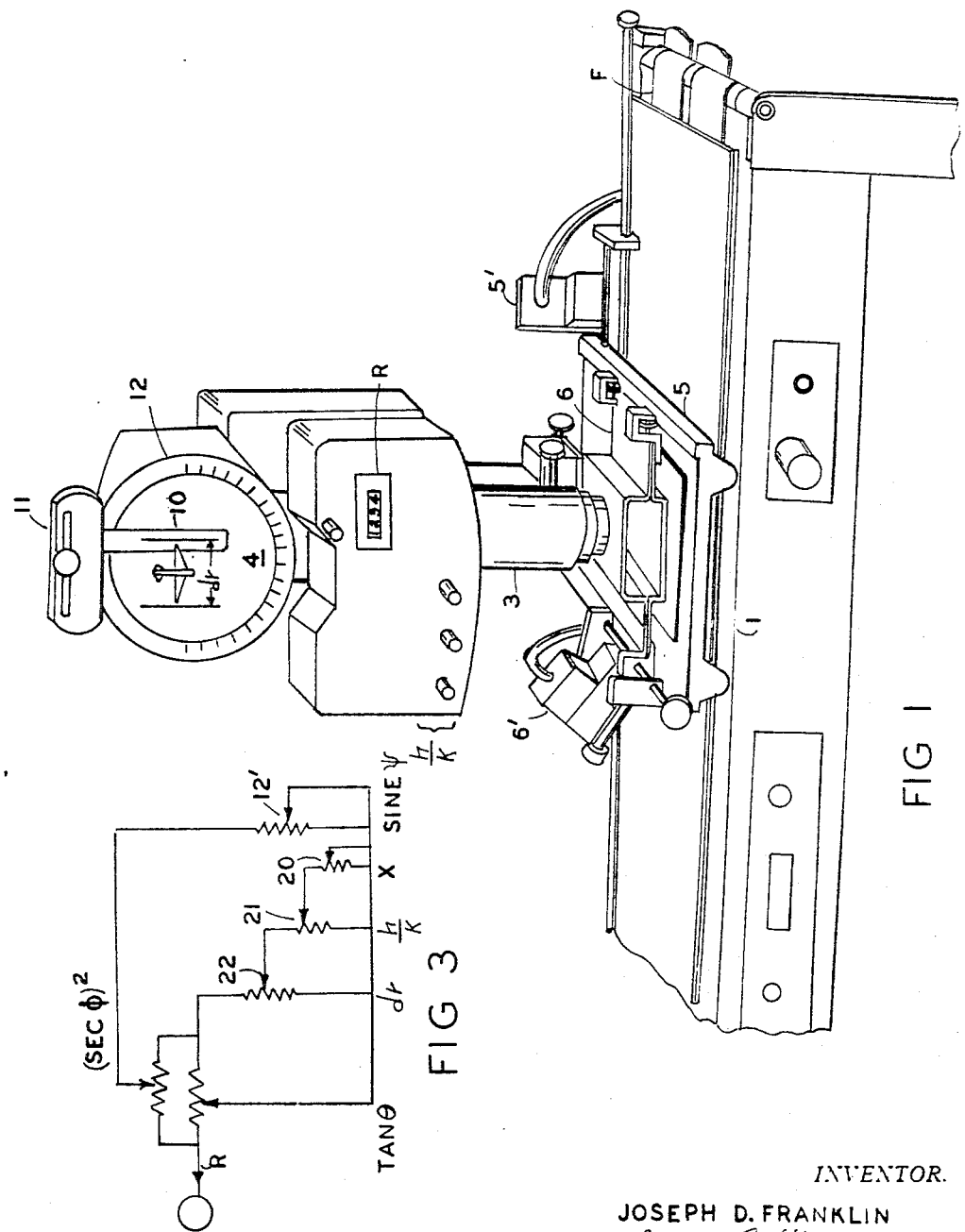
INVENTOR.
JOSEPH D. FRANKLIN

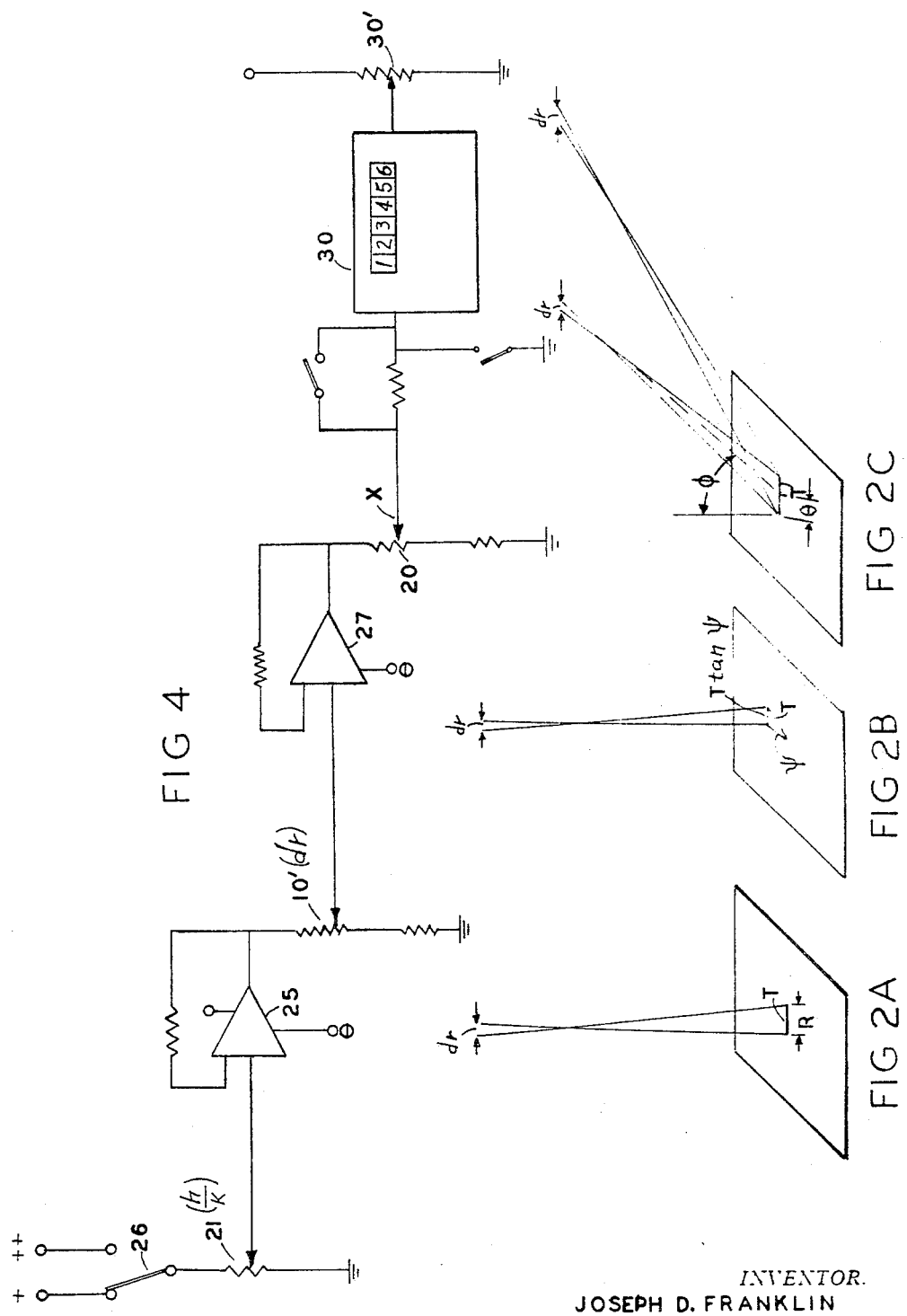

United States Patent Office 3,473,227
Patented Oct. 21, 1969

3,473,227
TARGET MEASURING MEANS
Joseph D. Franklin, Rocky Point, N.Y., assignor to
OPTOmechanisms, Inc., Plainview, N.Y.
Filed July 26, 1967, Ser. No. 656,084
Int. Cl. G01c *21/20;* G01b *3/14, 5/24*
U.S. Cl. 33—1     6 Claims

ABSTRACT OF THE DISCLOSURE

A direct target measuring indicator for aerial film interpretation. The target image is projected onto a display screen. A traveling index is provided to measure the target image on the screen. The index may be rotated to line up the target image. A signal proportional to the measurement is generated and this signal is corrected for various system parameters and the corrected measurement is displayed in digital or other convenient form.

---

This invention relates to target measuring means and more particularly to a direct analog target measuring computer and display.

In interpreting aerial photographs and more particularly in measuring distances shown on the photographs, the present practice is to measure X and Y components of the desired distance and then compute the ground measurement separately.

Summary of the invention

The present invention provides a direct analog computer connected to measuring index which make direct measurements on the target image. Means are provided to project the image onto a display screen. A traveling index is rotatably mounted on the screen so as to move along the distance desired. The measuring means generates a signal proportional to the measurement. This signal is corrected for various system parameters such as the altitude, camera lens angle, and the vertical angle of taking the picture.

Accordingly a principal object of the invention is to provide new and improved direct target measuring means for making measurements of images on films.

Another object of the invention is to provide new and improved direct target measuring means for making measurements of images on film including computer means to correct for predetermined system parameters.

Another object of the invention is to provide new and improved direct analog target measuring computer means with digital output.

Another object of the invention is to provide new and improved correction measuring means for a film viewer comprising, means to display a target image projected from said film, index means movably mounted on said display means to measure said target, means connected to said index means to generate a signal proportional to measurement of said index means, and means to correct said signal for system parameters.

These and other objects of the invention will be apparent in the following specification and drawings:

Description of drawings

FIGURE 1 is a perspective view of an embodiment of the invention.

FIGURES 2A, 2B, and 2C are diagrams illustrating the operation of the invention.

FIGURES 3 and 4 are schematic circuit diagrams.

Detail description

The present direct analog target mensuration computer is a fixed purpose direct analog computer which uses a passive electromechanical network to automatically convert selected photo distances into ground distances.

The present totally integrated material instrument is a direct analog target mensuration computer which is a system comprising rear projection zoom microscope, mensuration filars, scale select and calibration controls, and the electronic and display components. This instrument relieves the photo analyst of all image metrics computations, eliminates computational errors, and speeds up his work.

The present direct analog mensuration system is uniquely different to other photo mensuration system in that it will automatically measure randomly oriented vector distances on photos or other imagery directly rather than indirectly such as is done in the so-called X–Y systems, thus reducing the number of extrapolation steps to one (1) and also totally eliminating the computational time normally required to arrive at a photo metric solution. For example, the X–Y method is equated as follows:

$$R = \frac{h}{k}\sqrt{(drx^2 + dry^2)}$$

where $h/k$ is a system parameter proportional to altitude and camera lens coverage angle.

In order to solve this equation the two independent derivatives $rX$ and $rY$ must first be extrapolated individually from the photo image and substituted into the radical as indicated. The root of their sum squares then becomes the actual photo distance of the vector being measured, and only then can the computation for ground distance proceed.

In the case of the present direct analog system, mensuration filars or movable index are substituted for X–Y mechanics in the film viewing component, and being rotatable, orient directly to the random vector. Thus, the length of the vector is automatically measured directly, and formula one (1) is replaced by the simple, one-step equation as follows:

$$R = \frac{h}{k}(dr)$$

The movement of the mensuration index in the present system is mechanically connected to the electrical system of the computer. When the spacing of the movable index is changed by the operator in delineating objects for measurement, the value of the reference current flowing through the computer network is likewise changed automatically. The resulting amount of current flow is displayed as linear feet on a specially calibrated digital meter and indicates the ground distance being delineated on the photo by the filar or index spacings. As such, the readout is in direct analog to the problem and no computations are required in order to arrive at a solution.

In addition to the index control, the present system also incorporates an operator controlled "scale select" display so that the desired photo scale constant $h/k$ for any series of mensurations is automatically assimilated into the formula by the computer.

The total translation from input to output is as follows.

$$R = \frac{h}{k}[(\sec \phi - \tan \theta)^{2-\sin \psi}]\,dr$$

In this example $(dr)$ is photo distance,
$h/k$ is photo scale,
R is the resultant ground vector length display,
$\phi$ = angle of camera direction to vertical,
$\theta$ = angle of coverage of camera lens,
$\psi$ = angular orientation of target.

A special innovation contained in the present invention is an automatic compensator for variable magnification of the zoom viewer. Since changing the image size via zoom control would normally result in a change of ($dr$) value, a conversion factor is added to Equation 2 for automatic assimilation by the computer as follows:

$$R = \frac{h}{k} \frac{(dr)}{x}$$

where $x$ is the magnification factor of the viewing system.

The totally integrated direct analog target mensuration computer relieves the photo analyst of all image metrics computation, eliminates computational errors, and speeds up his work.

Referring to FIGURE 1, the invention generally comprises a light table 1 upon which the film F is mounted. The light table is illuminated from underneath and the film image is projected through a zoom lens system 3 onto a display screen 4. The display system is mounted on X and Y carriages 5 and 6. It may be similar to that in copending application 509,707 filed Nov. 26, 1965, now Patent No. 3,376,762, for spotting projectorscope.

The carriages have signal transmitters 5' and 6', which provide signals proportional to the travel of the carriages along the X and Y axes. The generator 5' generates a signal proportional to angle $\phi$ which is the direction of the target angle from the vertical.

The measuring index 10 is mounted on a bracket 11 for movement in one direction for making a measurement $dr$. If the distance to be measured is at a vector angle then the ring 12 is rotated to properly align the index 10. This automatically inserts the correction angle $\psi$.

The measuring index 10 is connected to a potentiometer 10' or other signal generating means for generating a signal proportional to the measurement $dr$. The ring 12 is connected to a potentiometer 12' to generate a signal proportional to the angle of rotation Psi. The signal proportional to $dr$ is corrected in accordance with various parameters which may be explained as follows in connection with 2A, 2B, 2C.

FIGURE 2A shows the situation when the target T is directly underneath the camera so that the reading $dr$ is directly proportional to R and need only be modified by a factor proportional to the altitude and the camera lens angle.

FIGURE 2B shows the situation where the target is at an angle. In order to line up this target with the linear measuring index, the ring 12 is rotated through the angle $\psi$ and the correction is proportional to the sine of angle $\psi$.

FIGURE 2C shows the effect of taking the picture from different angles from the vertical. This correction is proportional to the secant of angle $\phi$.

FIGURE 3 shows a schematic circuit diagram showing how the various corrections are applied. The angle Psi potentiometer 12', is connected to the ring 12 and provides a signal proportional to the sine of the angle Psi($\psi$). The potentiometer 20 is connected to the lens 3 control and provides a signal proportional to the magnification.

The potentiometer 21 provides a signal constant factor $h/k$ which is proportional to the altitude.

The potentiometer 10' is connected to the index 10 and provides signal proportional to the measurement $dr$.

The potentiometer 22 provides a signal proportional to the lens angle which is an adjustable constant factor. The product of these signal provides a solution to the problem as shown by the equation $$R = \left[\frac{h}{k}(\sec \phi - \tan \theta)^{2-\sin \psi}\right] dr$$

The output R is fed to a suitable display device such as a digital indicator which may be calibrated in feet or other convenient measurement.

FIGURE 4 shows a schematic diagram using amplified signals. The input of the potentiometer 21 is supplied by switch 26 from a selected voltage source for different scales. The potentiometer 21 supplies a signal proportional to $h/k$ which is applied to the amplifier 25.

The output of amplifier 25 is fed to potentiometer 10' the pointer of which is operated by the index 10 to provide a signal proportional to $dr$. This signal is connected to amplifier 27 the output of which is applied to potentiometer 20. The pointer of potentiometer 20 is conected to the zoom lens and generates a signal proportional to the magnification X. This signal is fed to the display indicator 30 which is preferably a conventional digital output device having a zero adjustment potentiometer 30'. Other conventional indicators such as volt or current meters could be calibrated and used to indicate the measurement. The power for the various circuits is supplied by a conventional power supply which supplies various voltages needed.

The embodiment of FIGURE 4 is a simplified and limited version and does not employ the $\phi$, $\theta$, and $\psi$ angle corrections.

I claim:
1. Correction measuring means for a film viewer comprising:
   means to display a target image projected from said film,
   index means movably mounted on said display means to measure said target,
   means connected to said index means to generate a signal proportional to measurement of said index means,
   means to correct said signal for system parameters, and
   means to rotate said image and means to generate a correction signal proportional to said rotation.

2. Apparatus as in claim 1 having means to display said corrected measurement in digital form.

3. Apparatus as in claim 1 wherein said correction means includes means to correct said measurement proportionally to the camera angle from the vertical direction.

4. Apparatus as in claim 1 where said correction means includes means to correct said measurement proportionally to the angle of coverage of the camera lens.

5. Apparatus as in claim 1 wherein said correction means includes means to correct said measurement proportionally to magnification of the system.

6. Apparatus as in claim 1 wherein said correction means includes means to rotate the image and means to generate a correction signal proportional to said rotation,
   means to correct said measurement proportionally to the camera angle from the vertical direction,
   means to correct said measurement proportionally to the angle of coverage of the camera lens, and
   means to correct said measurement proportionally to magnification of the system.

References Cited

UNITED STATES PATENTS 3,186,090   6/1965   Gerber _____ 33—1
3,024,696   3/1962   Bomzer _____ 88—24

LEONARD FORMAN, Primary Examiner

F. J. D'AMBROSIO, Assistant Examiner

U.S. Cl. X.R.

33—125; 353—11; 356—164